US009868406B2

(12) United States Patent
Horst et al.

(10) Patent No.: US 9,868,406 B2
(45) Date of Patent: Jan. 16, 2018

(54) ONE-PIECE INTERIOR TRIM PANEL FOR A MOTOR VEHICLE AND METHOD FOR MANUFACTURING SUCH AN INTERIOR TRIM PANEL

(71) Applicant: GM GLOBAL TECHNOLOGY OPERATIONS LLC, Detroit, MI (US)

(72) Inventors: Thomas Horst, Büttelborn (DE); Michael Silz, Heidesheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/974,214

(22) Filed: Dec. 18, 2015

(65) Prior Publication Data

US 2016/0176362 A1 Jun. 23, 2016

(30) Foreign Application Priority Data

Dec. 20, 2014 (DE) .................... 10 2014 019 312

(51) Int. Cl.
*B62D 39/00* (2006.01)
*B60R 13/02* (2006.01)
(52) U.S. Cl.
CPC ...... *B60R 13/02* (2013.01); *B60R 2013/0287* (2013.01)
(58) Field of Classification Search
CPC .................... B60R 13/02; B60R 2013/0287
See application file for complete search history.

(56) References Cited

U.S. PATENT DOCUMENTS

| 9,010,841 | B1* | 4/2015 | Kwolek | ............ B60R 13/0243 |
| | | | | 296/146.7 |
| 2001/0033092 | A1 | 10/2001 | Ader et al. | |
| 2011/0221170 | A1* | 9/2011 | Thurston | ............ B60R 13/0206 |
| | | | | 280/728.1 |
| 2011/0221172 | A1* | 9/2011 | She | ........................ B29C 70/74 |
| | | | | 280/730.2 |
| 2012/0119533 | A1* | 5/2012 | She | ....................... B60R 13/025 |
| | | | | 296/1.08 |
| 2013/0140846 | A1* | 6/2013 | Montoya | ............ B60R 13/0243 |
| | | | | 296/146.7 |

(Continued)

FOREIGN PATENT DOCUMENTS

| DE | 202005010218 U1 | 11/2005 |
| DE | 102004033139 A1 | 1/2006 |
| DE | 102005042914 A1 | 4/2007 |

(Continued)

OTHER PUBLICATIONS

German Patent Office, German Search Report for German Application No. 102014019312.8, dated Nov. 13, 2015.

*Primary Examiner* — Lori L Lyjak
(74) *Attorney, Agent, or Firm* — Lorenz & Kopf LLP

(57) ABSTRACT

A one-piece interior trim panel for a motor vehicle and method of manufacture is disclosed which includes a trim section configured to face the vehicle interior and a handle section that is arranged on the trim section such that a handle cavity is formed in the interior trim panel. The handle section features a recess that points in the vertical direction and through which a person can reach behind the rear side of a segment of the trim section. The present disclosure furthermore concerns a method for manufacturing such an interior trim panel.

15 Claims, 3 Drawing Sheets

(56) References Cited

U.S. PATENT DOCUMENTS

2013/0154304 A1\* 6/2013 Tobey ................ B60R 13/0243
296/146.7

FOREIGN PATENT DOCUMENTS

| DE | 8614594 U1 | 2/2009 |
| --- | --- | --- |
| DE | 102008034252 A1 | 1/2010 |
| DE | 102011017336 A1 | 10/2012 |
| EP | 2 329 992 A3 \* | 6/2011 |
| EP | 2329977 A2 | 6/2011 |
| JP | H09193665 A | 7/1997 |

\* cited by examiner

ONE-PIECE INTERIOR TRIM PANEL FOR A MOTOR VEHICLE AND METHOD FOR MANUFACTURING SUCH AN INTERIOR TRIM PANEL

CROSS-REFERENCE TO RELATED APPLICATIONS

This application claims priority to German Patent Application No. 102014019312.8, filed Dec. 20, 2014, which is incorporated herein by reference in its entirety.

TECHNICAL FIELD

The present disclosure pertains a method and device forming a one-piece interior trim panels for motor vehicles with a trim section configured to face the vehicle interior and having a handle section arranged on the trim section such that a handle cavity is formed in the interior trim panel.

BACKGROUND

One-piece interior trim panels for motor vehicles, which typically consist of plastic and are manufactured by means of a plastic injection-molding process, are known from practical applications. These interior trim panels feature a trim section configured to face the vehicle interior and is essentially realized in a plate-shaped or wall-like fashion, as well as a handle section that is arranged on the trim section such that a handle cavity is formed in the interior trim panel. The handle section and the handle cavity form a hand grip of sorts that can be taken hold of by a person in order to pivot a hatch or tailgate of the motor vehicle, on which the interior trim panel is arranged.

Such interior trim panels feature an integrated release element configured to actuate a hatch or tailgate of the motor vehicle. Interior trim panels of this type may furthermore also be arranged on stationary components of the motor vehicle in order to enable a passenger of the vehicle to hold on to the hand grip formed by the handle section and the handle cavity. The handle sections, which are realized in one piece with the trim section, are in this case essentially closed and designed in a recessed or trough-shaped fashion. Consequently, the handle sections typically feature two boundary walls that lie opposite of one another in the vertical direction, two sidewalls that lie opposite of one another in the lateral direction and a bottom wall that essentially lies opposite of the handle cavity opening, wherein these walls completely define the handle cavity in the cited directions. In this case, at least one of the boundary walls is inclined relative to the adjacent trim section in such a way that it is possible to reach behind the transition region between the trim section and the boundary wall. This should make it possible to securely take hold of the interior trim panel in this region. However, it was determined that the inclination of the aforementioned boundary wall relative to the trim section is in most instances inadequate for securely taking hold of the interior trim panel in the region of the handle cavity. Furthermore, the slight angle of inclination between the boundary wall and the trim section required for securely taking hold of the interior trim panel can only be realized with increased effort and—depending on the remaining design of the interior trim panel—occasionally not at all. This is the case, in particular, when the interior trim panel should be manufactured by means of a permanent mold during the course of the plastic injection-molding process.

SUMMARY

In accordance with the present disclosure, a one-piece interior trim panel for a motor vehicle includes a trim section and a handle section, which on the one hand makes it possible to securely take hold of the interior trim panel in the region of the handle section and on the other hand can be easily manufactured. The present disclosure furthermore provides a simplified manufacturing method for manufacturing such a one-piece interior trim panel for a motor vehicle.

One embodiment of the present disclosure concerns a one-piece interior trim panel for a motor vehicle. In this case, the interior trim panel is preferably realized in a wall-like fashion. The interior trim panel can be or is fastened, for example, on the side of a hatch or tailgate of a motor vehicle which faces the vehicle interior. The one-piece interior trim panel features a trim section configured to face the vehicle interior, and is preferably realized in a wall-shaped or plate-shaped fashion, if applicable with curvatures, as well as a handle section. The handle section preferably is essentially realized in a recessed or trough-shaped fashion. The handle section is arranged on the trim section such that a handle cavity is formed in the interior trim panel. Since the interior trim panel is realized in one piece, it goes without saying that the handle section is also realized in one piece with the trim section. For example, the handle section and the trim section were jointly manufactured in one piece during the course of a molding process, injection-molding process or plastic injection-molding process.

Even though the handle section should essentially be realized in a recessed or trough-shaped fashion, one distinction from conventional closed trough-shaped or recessed handle sections can be seen in that the handle section features a recess that points in the vertical direction and makes it possible to reach behind the rear side of a segment of the trim section. In this context, the vertical direction refers to the coordinate system of the interior trim panel itself and does not necessarily have to coincide with the vertical direction within the motor vehicle featuring this interior trim panel. The recess in fact may in the installed state within the motor vehicle point downward or upward in the vertical direction of the motor vehicle, leftward or rightward in the lateral direction of the motor vehicle or forward or rearward in the longitudinal direction of the motor vehicle depending on which motor vehicle component the interior trim panel is arranged or fastened.

In a particularly preferred application, in which the one-piece interior trim panel is arranged or fastened on the tailgate of a motor vehicle, the recess preferably points downward in the vertical direction of the motor vehicle. Since a boundary wall in one vertical direction is analogously eliminated in the handle section of the one-piece interior trim panel described herein or merely a boundary wall with a recess is provided in order to define the handle cavity in this vertical direction, it is possible to securely reach behind the rear side of the segment of the trim section through the handle cavity and the recess. In addition, the manufacture is simplified because a boundary wall of the handle section for defining the handle cavity in the vertical direction is eliminated or only part of such a boundary wall is provided due to the aforementioned recess. This not only reduces the manufacturing effort, but also the weight of the one-piece interior trim panel.

In a preferred embodiment of the presently disclosed interior trim panel, at least two protruding projections are provided on the rear side of the segment, behind which a person can reach through the handle cavity and the recess. However, only one protruding projection could basically also be sufficient and advantageous. The at least two protruding projections provide the advantage that the interior trim panel can be more securely taken hold of in the region of the handle section and the segment of the trim section than it would be the case with a segment of the trim section, the rear side of which is formed by an essentially planar and/or smooth surface. The at least two protruding projections also create a relatively large region that can be taken hold of without thereby causing a substantial material accumulation in the region of the segment, which would ultimately increase the material costs and the manufacturing effort. In addition, the grip on the rear side of the segment of the trim section can be improved and the weight of the interior trim panel can be reduced by providing at least two protruding projections instead of only one protruding projection.

In an advantageous embodiment of the presently disclosed interior trim panel, the protruding projections on the rear side of the segment are realized in one piece with the segment in order to simplify the manufacture of the interior trim panel. The protruding projections therefore are preferably manufactured or produced together with the trim section and the handle section during the course of a common plastic injection-molding process.

In another advantageous embodiment of the presently disclosed interior trim panel, the protruding projections are realized in a rib-shaped or wall-shaped fashion in order to achieve a lightweight construction on the one hand and to cause a reinforcement of the segment of the trim section, behind which a person can reach, on the other hand.

According to another advantageous embodiment of the presently disclosed interior trim panel, the protruding projections on the rear side of the segment extend in the lateral direction of the interior trim panel. In this context, the lateral direction once again refers to the lateral direction of the interior trim panel, which does not necessarily have to coincide with the lateral or transverse direction of the motor vehicle, in which the interior trim panel can be installed. Since the protruding and preferably rib-shaped or wall-shaped projections extend in the lateral direction and therefore transverse to the recess in the handle section, it is possible to very securely take hold of these protruding projections. In this embodiment, one could also refer to the protruding projections as being realized elongate or oblong in the lateral direction.

In a particularly advantageous embodiment of the presently disclosed interior trim panel, the protruding projections are arranged successively in the vertical direction, into which the recess points, such that intermediate spaces are formed in order to thereby create a large region that can be securely taken hold of on the one hand and to achieve a lightweight construction on the other hand. As already indicated above, this also improves the grip on the rear side of the segment of the trim section.

In another preferred embodiment of the presently disclosed interior trim panel, the protruding projections are connected to a protruding support section arranged on the rear side of the segment in at least one lateral direction, preferably in both lateral directions. The at least one support section consequently serves for supporting the protruding projections such that the protruding projections can be realized less voluminous without thereby compromising the required rigidity or strength. This is particularly advantageous if the protruding projections are realized in a wall-like or rib-shaped fashion. In this case, the wall-shaped or rib-shaped protruding projections can be realized with particularly thin walls. In addition, the at least one protruding support section can serve as a guide for the fingers of the hand of a person taking hold of or reaching behind the segment of the trim section if the protruding support section protrudes over the free ends of the protruding projections in accordance with another preferred characteristic. In this embodiment, it is furthermore preferred that the protruding support section is realized in a wall-shaped or rib-shaped fashion.

In another advantageous embodiment of the presently disclosed interior trim panel, the at least one protruding support section is realized in one piece with the segment and/or the protruding projections.

In another advantageous embodiment of the presently disclosed interior trim panel, the protruding support section is realized in a rib-shaped or wall-shaped fashion.

According to another preferred embodiment of the presently disclosed interior trim panel, the protruding support section extends in the vertical direction, into which the recess of the handle section points. In this embodiment, one could also refer to the protruding support section as being realized oblong or elongate in said vertical direction.

The protruding projections basically may have the same height in the direction, in which they protrude from the rear side of the segment of the trim section. In another preferred embodiment of the presently disclosed interior trim panel, however, at least two of the protruding projections have a different height in order to make it possible to reach behind or take hold of the segment of the trim section in a particularly secure fashion.

In another preferred embodiment of the presently disclosed interior trim panel, at least one protruding projection, which is arranged farther from the recess in the handle section than another protruding projection, has a smaller height than the other protruding projection. Alternatively or additionally, at least one protruding projection, which is arranged closer to the recess in the handle section than another protruding projection, has a smaller height than the other protruding projection in this embodiment.

According to another advantageous embodiment of the presently disclosed interior trim panel, one of the protruding projections is vertically arranged between two protruding projections with a smaller height. The thusly created grip region can be comfortably and securely taken hold of, but nevertheless has a lightweight design due to the multiple protruding projections.

In another preferred embodiment of the presently disclosed interior trim panel, the free ends of at least a few protruding projections that are arranged in direct succession in the vertical direction, i.e. the ends facing away from the segment of the trim section, are arranged along an arc-shaped or S-shaped line. With respect to this embodiment, it was determined that five such protruding projections, which are arranged in direct succession in the vertical direction, should be arranged along such an arc-shaped line with their free ends in order to comfortably and securely take hold of the segment of the trim section.

In order to further improve the handling comfort, the free ends of at least a few protruding projections, preferably all protruding projections, are rounded in another preferred embodiment of the presently disclosed interior trim panel.

In another preferred embodiment of the presently disclosed interior trim panel, the protruding projections include an angle of inclination of no more than 90°, preferably less than 90°, with the rear side of the segment of the trim section. This takes into account the expected loads and stresses of the protruding projections, wherein such an angle of inclination can very reliably support the force applied by the hand of a person without having to realize the protruding projections particularly voluminous. In rib-shaped or wall-shaped protruding projections, in particular, this has the advantage that the rib-shaped or wall-shaped protruding projections can be realized with relatively thin walls, but the applied force nevertheless can be reliably supported. This is the case, in particular, if the angle of inclination between the protruding projections and the rear side of the segment amounts to less than 90°, wherein it was determined that an angle of inclination of less than 75° is particularly advantageous.

In another advantageous embodiment of the presently disclosed interior trim panel, the protruding projections, which include the aforementioned angle of inclination with the rear side of the segment, are inclined in such a way that the protruding projections are inclined away from the recess in the direction of the free ends.

In another advantageous embodiment of the presently disclosed interior trim panel, the recess is arranged in a plane that includes an angle of inclination of no more than 90°, preferably less than 90°, with the rear side of the segment of the trim section. This ensures that the handle section—viewed in the longitudinal direction of the interior trim panel through the handle cavity opening—completely covers the motor vehicle component, on which the interior trim panel is fastened, such that the risk of a collision of the hand with the motor vehicle component in the longitudinal direction is eliminated and the risk of injuries is minimized, wherein this is ensured, in particular, with an embodiment, in which the aforementioned angle of inclination amounts to less than 90°.

In another advantageous embodiment of the presently disclosed interior trim panel, the angle of inclination of the plane, in which the recess is arranged, relative to the rear side of the segment corresponds to the angle of inclination of the protruding projections in order to allow a simple removal of the interior trim panel from the mold during the course of the molding process, injection-molding process or plastic injection-molding process. Alternatively, the angle of inclination included by the plane, in which the recess is arranged, and the rear side of the segment is greater than the angle of inclination of the protruding projections in order to further promote the aforementioned advantage of a simple removal from the mold.

In a particularly preferred embodiment of the presently disclosed interior trim panel, the handle section is arranged on the trim section such that a handle cavity opening is formed in the trim section. In this context, it is preferred that the trim section completely surrounds the handle cavity opening. Consequently, the trim section of a thusly created interior trim panel does not have to be assembled of several initially separate trim parts such that the manufacture is simplified. Due to the recess provided in the handle section, however, it is nevertheless possible to securely reach behind the segment of the trim section and to likewise ensure a simple manufacture of the interior trim panel. Analogously, a trim section with an internal handle cavity opening is created in this case.

As already indicated above, the interior trim panel is in a particularly advantageous embodiment thereof realized in the form of a molded part, preferably an injection-molded part, particularly an injection-molded plastic part.

In another particularly advantageous embodiment of the presently disclosed interior trim panel, the handle section, the trim section and preferably also the protruding projections and/or the at least one support section of the interior trim panel can be or are manufactured by means of a permanent mold or a permanent mold section that respectively features only two separate permanent mold parts. The two separate permanent mold parts, which therefore can also be moved independently of one another, preferably can be transferred into a molding position, in which the mold cavity or mold cavity section for the handle section, the trim section and, if applicable, also for the protruding projections and/or the at least one support section of the interior trim panel is formed in its entirety, as well as respectively separated from one another in a predefined removal direction. The preceding description makes it clear that the handle section, the trim section and preferably also the protruding projections and/or the at least one support section of the interior trim panel are dimensioned and/or aligned or arranged relative to one another in such a way that only the two aforementioned permanent mold parts are required for their manufacture and other permanent mold parts such as, for example, an additional slide can be eliminated. Consequently, the manufacturing effort for the interior trim panel created with this embodiment is significantly reduced.

Another embodiment of the present disclosure concerns a method for manufacturing an interior trim panel of the above-described type. In this method, the interior trim panel is produced or manufactured during the course of a molding process, injection-molding process or plastic injection-molding process. The handle section, the trim section and preferably also the protruding projections and/or the at least one support section of the interior trim panel are in this case manufactured by means of a permanent mold or a permanent mold section that respectively features only two separate permanent mold parts. As already indicated above, this eliminates the need for an additional mold part in the manufacture of the handle section, the trim section and preferably also the protruding projections and/or the at least one support section of the interior trim panel such that, for example, no additional permanent mold part in the form of a slide or the like is required. The method for manufacturing the interior trim panel therefore is significantly simplified.

In a preferred embodiment of the presently disclosed method, the two separate permanent mold parts are transferred into a molding position, in which the mold cavity or mold cavity section for the handle section, the trim section and, if applicable, also for the protruding projections and/or the at least one support section of the interior trim panel is formed in its entirety, as well as respectively separated from one another in a predefined removal direction after the molding process.

According to a particularly preferred embodiment of the presently disclosed method, the two permanent mold parts used are realized in such a way that they abut on one another in the aforementioned molding position such that the recess in the handle section of the interior trim panel is formed.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
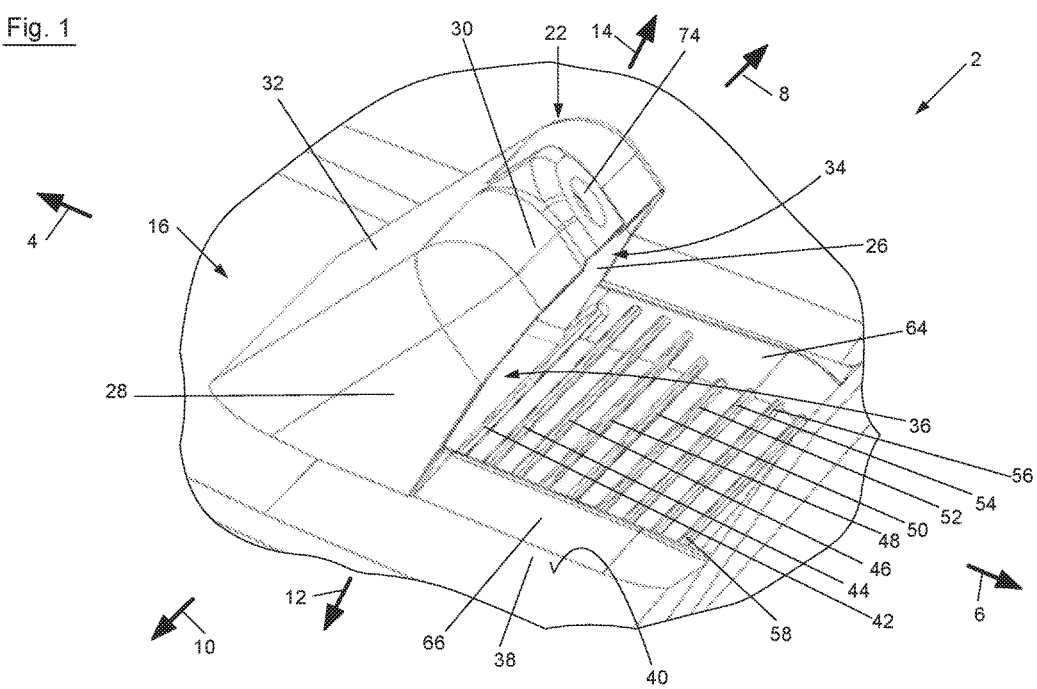
FIG. 1 shows a partial perspective view of an embodiment of the presently disclosed interior trim panel.
Figure 2:
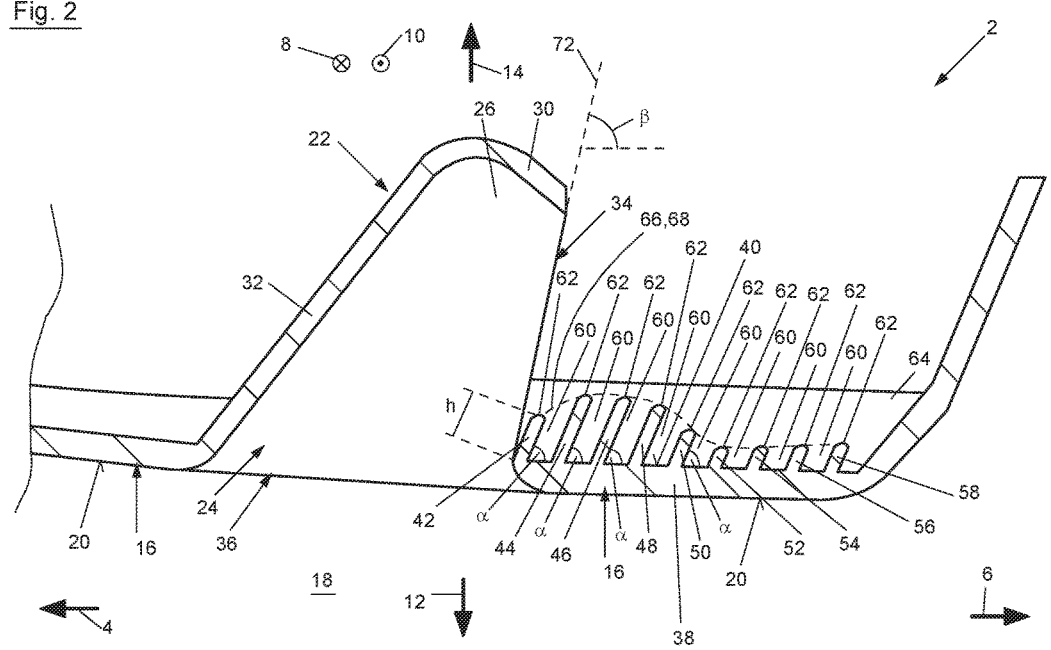
FIG. 2 shows a cross-sectional view of the interior trim panel according to FIG. 1.

FIGS. 1 and 2 show an embodiment of the presently disclosed interior trim panel 2 for a motor vehicle. The interior trim panel 2 is realized in one piece such that all components of the interior trim panel 2 described below are jointly realized in one piece. The interior trim panel 2 shown is realized in the form of a molded part, preferably an injection-molded part, particularly an injection-molded plastic part. Polypropylene or polyester plane was preferably used as material for the interior trim panel 2 in the form of an injection-molded plastic part.

In FIGS. 1 and 2, the opposite vertical directions 4, 6, the opposite lateral directions 8, 10 and the opposite longitudinal directions 12, 14 are indicated with corresponding arrows, wherein the cited directions 4 to 14 concern the corresponding directions of the interior trim panel 2, which do not necessarily have to coincide with the corresponding directions of the motor vehicle in the installed state of the interior trim panel 2 in a motor vehicle. For example, if the interior trim panel 2 shown is fastened on a tailgate of the motor vehicle, it is preferred that the vertical direction 6 of the interior trim panel 2 corresponds to the downward vertical direction of the motor vehicle.

The interior trim panel 2 features a trim section 16 that is realized in a wall-shaped fashion and essentially extends in a plane defined by the vertical directions 4, 6 and the lateral directions 8, 10. The trim section 16 has a front side 20 that extends in the longitudinal direction 12 and faces or should face the vehicle interior 18.

In addition, the interior trim panel 2 features an essentially trough-shaped or recessed handle section 22. The handle section 22 is arranged on or realized in one piece with the trim section 16 such that a handle cavity 24 is formed, which is offset behind the front side 20 of the trim section 16 in the longitudinal direction 14. The handle cavity 24 is respectively defined by sidewalls 26 and 28 of the handle section 22 in the lateral directions 8, 10, by a bottom wall 30 of the handle section 22 in the longitudinal direction 14 and by a boundary wall 32 of the handle section 22 in the vertical direction 4. In the vertical direction 6, in contrast, the handle cavity 24 is not defined or at best only partially defined by the handle section 22. In fact, the handle section 22 features a recess 34 that points in the vertical direction 6. The handle cavity 24 furthermore features a handle cavity opening 36 that points in the longitudinal direction 12 and therefore is provided in the region of the trim section 16. The handle cavity opening 36 is completely surrounded by the trim section 16 as illustrated, in particular, in FIG. 1, in which the handle cavity opening 36 is surrounded by the trim section 16 in the lateral directions 8, 10 and in the vertical directions 4, 6. Consequently, it is possible to reach behind a segment 38 of the trim section 16, which respectively follows the handle cavity opening 36 or the recess 34 in the vertical direction 6, through the handle cavity opening 36 and the recess 34. More precisely, a person can reach behind a rear side 40 of the segment 38 which faces away from the front side 20 of the segment 38 through the handle cavity opening 36 and the recess 34.

Several protruding projections 42, 44, 46, 48, 50, 52, 54, 56, 58 are provided on the rear side 40 of the segment 38 and successively arranged in the vertical direction 6 such that intermediate spaces 60 are formed in between. The protruding projections 42 to 58 are realized in one piece with the segment 38 and in a rib-shaped or wall-shaped fashion. The protruding projections 42 to 58 respectively extend transverse to the recess 34 in the lateral directions 8, 10. The protruding projections 42 to 58 respectively also feature a free end 62 that faces away from the segment 38 and therefore essentially points in the longitudinal direction 14, wherein said free end is rounded in order to make it possible to comfortably reach behind and take hold of the segment of the trim section.

According to FIG. 1, in particular, the protruding projections 42 to 58 are connected to a protruding support section 64, 66 arranged on the rear side 40 of the segment 38 in both lateral directions 8, 10, wherein the two protruding support sections 64, 66 are likewise realized in one piece with the segment 38 of the trim section 16 and the protruding projections 42 to 58. In this case, the protruding support sections 64, 66 extend in the vertical directions 4, 6 in order to be connected to all protruding projections 42 to 58. In the embodiment shown, the protruding support sections 64, 66 are realized in a rib-shaped or wall-shaped fashion and respectively extend in a plane defined by the longitudinal directions 12, 14 and the vertical directions 4, 6, wherein the rib-shaped or wall-shaped protruding support sections 64, 66 abut in the vertical direction 4 on the respectively assigned sidewall 26 or 28 or preferably are realized in one piece therewith.

The protruding projections 42 to 58 respectively have a height h in the direction, in which they protrude from the rear side 40 of the segment 38. However, not all protruding projections 42 to 58 have the same height h as illustrated, in particular, in FIG. 2. In fact, at least one protruding projection such as, for example, the protruding projection 50, which is arranged farther from the recess 34 than another protruding projection. e.g. the protruding projection 48, has a smaller height h than the other protruding projection 48. In addition, at least one protruding projection such as, for example, the protruding projection 42, which is arranged closer to the recess 34 than another protruding projection, e.g. the protruding projection 44, has a smaller height h than the other protruding projection 44. In the embodiment shown, at least one protruding projection, for example the protruding projection 48, is in the vertical direction 4, 6 arranged between two protruding projections with a smaller height h, for example the protruding projection 42 on one side and the protruding projection 50 on the other side. This makes it possible to take hold of and reach behind the segment of the trim section in a particularly comfortable and secure fashion. In the embodiment shown, this advantage is additionally promoted by arranging the free ends 62 of the protruding projections 42, 44, 46, 48, 50, which are arranged in direct succession in the vertical direction 6, along an arc-shaped line 68 as indicated with a broken line in FIG. 2. Furthermore, the free ends 62 of the protruding projections 42 to 58, which are arranged in direct succession in the vertical direction 6, are arranged along an S-shaped line 70 as likewise indicated with a broken line in FIG. 2.

On their side that faces away from the recess 34, the rib-shaped or wall-shaped protruding projections 42 to 58 may basically include an angle of inclination α amounting to 90° with the rear side 40 of the segment 38 of the trim section 16. The angle of inclination α preferably should amount to no more than 90°. According to FIG. 2, in particular, the angle of inclination α in the embodiment shown is smaller than 90°. This represents a particularly preferred embodiment because the force applied by the hand of a person can thereby be supported particularly well and the rib-shaped or wall-shaped protruding projections 42 to 58 can have a smaller wall thickness. In this respect, angles of inclination α amounting to less than 75° proved particularly advantageous. The protruding projections 42 to 58 are in this case inclined in such a way that their free ends 62 are respectively inclined away from the recess 34 or offset relative to the other components of the respective protruding projection 42 to 58 in the vertical direction 6.

FIGS. 1 and 2 furthermore show that the recess 34 is arranged in a plane 72 that includes an angle of inclination β of no more than 90° with the rear side 40 of the segment 38 of the trim section 16, preferably an angle of less than 90°—as illustrated in the figures. The angle of inclination β may correspond to the angle of inclination α of the protruding projections 42 to 58 or be greater than the angle of inclination α as it is the case in the embodiment shown. In this way, the interior trim panel 2 in the form of an injection-molded plastic part can be very easily removed from the mold during the course of the injection-molding process.

Prior to describing the method for manufacturing the interior trim panel 2 in greater detail, it should be noted that a fastening device 74 is provided in the bottom wall 30 of the handle section 22 in order to fasten the interior trim panel 2 on the respective motor vehicle component, preferably the tailgate. In the embodiment shown, the fastening device 74 is formed by a fastening recess, into which a screw, a clip or another fastening means can be inserted such that the interior trim panel 2 is fastened on the motor vehicle component. The bottom wall 30 is also realized in such a way that it can be or is supported in the installed state on the motor vehicle component in order to ensure a reliable support of the interior trim panel 2 on the respective motor vehicle component, preferably the tailgate.

Figure 3:
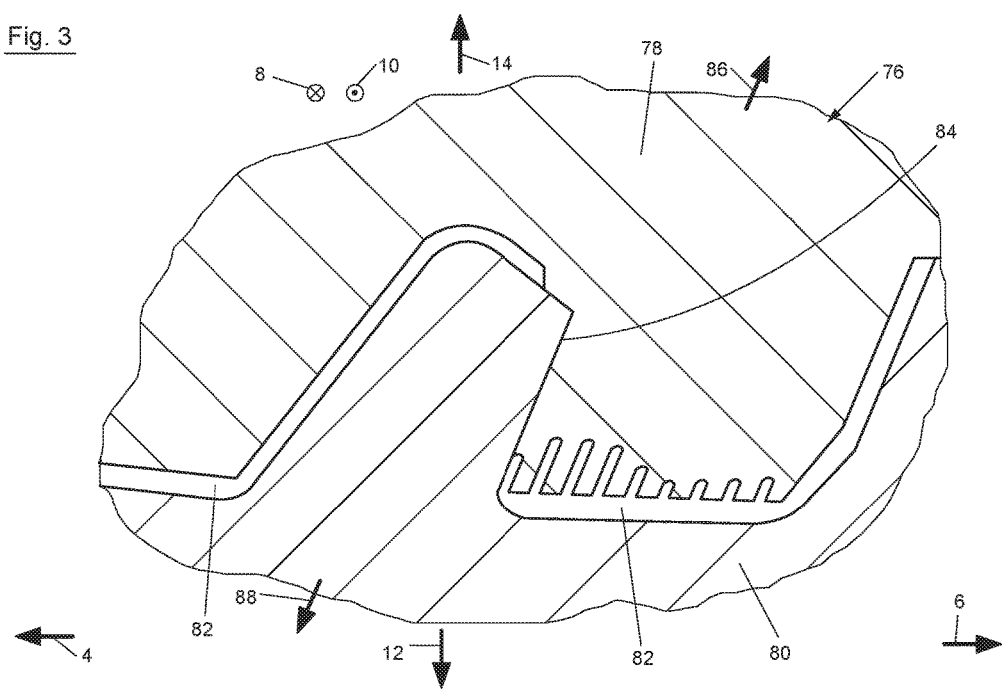
FIG. 3 shows a cross-sectional view of a mold or a mold section for manufacturing the trim section, the handle section, the protruding projections and the protruding support sections of the interior trim panel according to FIGS. 1 and 2.

As already indicated above, the interior trim panel 2 is manufactured during the course of a molding process or injection-molding process, in this case a plastic injection-molding process. For example, the handle section 22, the trim section 16, the protruding projections 42 to 58 and the two protruding support sections 64, 66 were manufactured by means of a permanent mold or a permanent mold section 76 that respectively features only two separate permanent mold parts 78, 80 as illustrated in FIG. 3. In this context, a permanent mold is used if the complete interior trim panel 2 is manufactured with the aid of the permanent mold whereas a permanent mold section is used if it merely represents a section of a permanent mold for manufacturing the entire interior trim panel 2. The permanent mold or the permanent mold section 76 features a first permanent mold part 78 and a second permanent mold part 80 that is realized separately of the first permanent mold part 78.

During the course of the injection-molding process, the two permanent mold parts 78, 80 are transferred into the molding position illustrated in FIG. 3 such that a mold cavity or mold cavity section 82 for the handle section 22, the trim section 16, the protruding projections 42 to 58 and the protruding support sections 64, 66 of the interior trim panel 2 is respectively formed. In the molding position, the two permanent mold parts 78, 80 abut on one another along a contact surface 84 such that the subsequent recess 34 in the handle section 22 is formed. After the molding or injection-molding process, the two permanent mold parts 78, 80 are once again separated from one another in order to remove the interior trim panel 2 from the mold, wherein this is achieved by moving the first permanent mold part 78 relative to the interior trim panel 2 being produced in a first removal direction 86 while the second permanent mold part 80 is moved relative to the interior trim panel 2 being produced in a second removal direction 88. In this case, the first removal direction 86 corresponds to the direction, in which the protruding projections 42 to 58 extend from the segment 38 to their free ends 62. The second removal direction 88 preferably extends opposite to the first removal direction 86.

The preceding description of the manufacturing method makes it clear that the handle section 22, the trim section 16, the protruding projections 42 to 58 and the protruding support sections 64, 66 of the interior trim panel 2 can be or are manufactured by means of a permanent mold or a permanent mold section 76 that respectively features only two separate permanent mold parts, in this case the first and the second permanent mold parts 78, 80, such that additional slides or the like can be eliminated and the manufacture of the interior trim panel 2 is significantly simplified. This is achieved by suitably dimensioning and arranging the described components of the interior trim panel 2 relative to one another.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A one-piece interior trim panel for an interior of motor vehicle comprising:
   a trim section configured to face the vehicle interior; and
   a handle section arranged on the trim section and forming a handle cavity in the interior trim panel, wherein the handle section comprises a recess extending in a vertical direction to provide access to a back side of a segment of the trim section; and
   at least two protruding projections in the form of a wall-shaped element provided on a rear side of the segment, wherein the at least two protruding projections extend in a lateral direction and are arranged successively in the vertical direction such that intermediate spaces are formed therebetween.

2. The interior trim panel according to claim 1, wherein the at least two protruding projection are integrated with the segment as one piece.

3. The interior trim panel according to claim 1, wherein the at least two protruding projection are connected to a support section arranged on the rear side of the segment in at least one lateral direction, wherein the support section extend in the vertical direction.

4. The interior trim panel according to claim 3, wherein the support section are integrated with the at least two protruding sections and the segment as one piece.

5. The interior trim panel according to claim 1, wherein a first protruding projection has a height that is less than a second protruding projection and is arranged closer to the recess than the second protruding projection.

6. The interior trim panel according to claim 5, further comprising a plurality of intermediate protruding projection having free ends arranged along an arc or S-shape to define a curved profile.

7. The interior trim panel according to claim 6, wherein each of the protruding projections have a free end with a rounded profile.

8. The interior trim panel according to claim 1, wherein the at least two protruding projections inclined away from the recess at an angle of inclination of less than 90° with the rear side of the segment.

9. The interior trim panel according to claim 8, wherein the recess is arranged in a plane that includes an angle of inclination of less than 90° with the rear side of the segment, wherein the angle of inclination of the recess is equal to or greater than the angle of inclination of the protruding projections.

10. The interior trim panel according to claim 1, wherein the recess is arranged in a plane that includes an angle of inclination of less than 90° with the rear side of the segment.

11. A one-piece interior trim panel for an interior of motor vehicle comprising:
    a trim section configured to face the vehicle interior; and
    a handle section arranged on the trim section and forming a handle cavity in the interior trim panel, wherein the handle section comprises a recess extending in a vertical direction to provide access to a back side of a segment of the trim section,
    wherein the handle section is arranged on the trim section such that an opening for the handle cavity opening is formed in the trim section such that the trim section completely surrounds the handle cavity opening.

12. The interior trim panel according to claim 1, wherein the interior trim panel comprises an injection-molded plastic part.

13. A method for manufacturing an interior trim panel comprising:
    providing a permanent mold having two separate mold parts, which when assembled form a mold cavity defining a trim section configured to face the vehicle interior and a handle section arranged on the trim section and forming a handle cavity in the interior trim panel, wherein the handle section comprises a recess extending in a vertical direction to provide access to a back side of a segment of the trim section and at least two protruding projections in the form of a wall-shaped element provided on a rear side of the segment, wherein the at least two protruding projections extend in a lateral direction and are arranged successively in the vertical direction such that intermediate spaces are formed therebetween;
    injecting a molding material comprising a plastic into the mold cavity to form an interior trim panel; and
    separating the two mold parts and removing the interior trim panel from the permanent mold.

14. The method according to claim 13, wherein the method further comprises transferring the two separate permanent mold parts a molding position, in which the mold cavity for the handle section and the trim section is formed in its entirety, as well as respectively separated from one another in a predefined removal direction after the molding process.

15. The method according to claim 14, wherein the two permanent mold parts abut on one another in the molding position such that the recess is formed.

\* \* \* \* \*